April 25, 1950 E. TORCHEUX 2,505,262
ELECTROMECHANICAL REMOTE CONTROL DEVICE
Filed Aug. 9, 1946
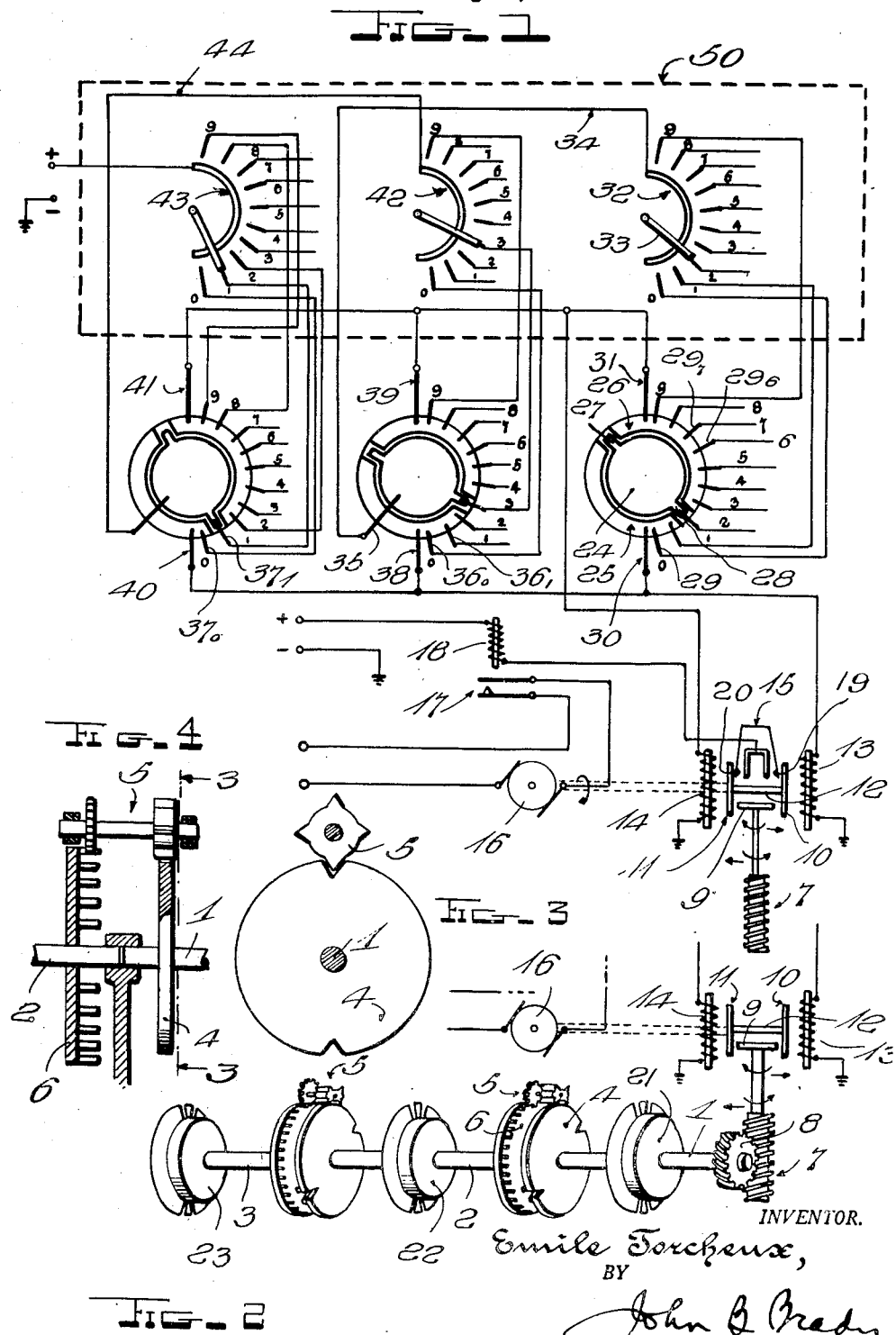
INVENTOR.
Emile Torcheux,
BY
John B. Brady
ATTORNEY Patented Apr. 25, 1950

2,505,262

UNITED STATES PATENT OFFICE 2,505,262

ELECTROMECHANICAL REMOTE-CONTROL DEVICE

Emile Torcheux, Paris, France, assignor to Societe Francaise Radio-Electrique, a corporation of France Application August 9, 1946, Serial No. 689,472
In France January 22, 1943

Section 1, Public Law 690, August 8, 1946
Patent expires January 22, 1963

3 Claims. (Cl. 74—202)

My invention relates generally to remote control mechanism and more particularly to an improved mechanism for controlling the angular shift of shaft portions, discontinuously and rotatively linked in predetermined ratios.

More precisely this invention relates to a device for controlling and adjusting from a distance, by means of one single servo-motor, at predetermined values the angular shift of shaft portions, driving each other in a discontinuous manner with a certain ratio of reduction in angular movement.

Assemblies of shaft portions of the type concerned with my invention are to be found, for instance in cyclometric counters with drums bearing numerals and in radio apparatus involving successive frequency changes, which are described in copending United States patent application Serial Number 591,714, filed on the 3rd of May, 1945 entitled "Device for conversion of frequencies."

The device of my invention comprises the combination of special rotating commutators and a series of brushes, respectively mounted on the shaft portions, and of relays fed through these commutators and controlling the operation from the driving motor, in one or the other direction, of the shaft portions, and also controlling the energization of the driving motor.

The invention will be better understood by referring to the accompanying drawings and specification following, which illustrate, by way of a nonlimitative example, one embodiment of my invention and in which:

Fig. 1 is a schematic view of the mechanism of my invention, with parts of the mechanism on the same shaft spacially separated to show the relation of the components;

Fig. 2 is a perspective view of the control shaft and associated parts of the control mechanism embodying my invention;

Fig. 3 is a detail view of the control mechanism, taken substantially on line 3—3 of Fig. 4; and Fig. 4 is a side elevational view of the control mechanism shown in Fig. 3, partially broken away and shown in section.

Figs. 1 and 2 are related to show the parts of the mechanism in juxta-positions in Fig. 1 and the same parts in assembled relation in Fig. 2. The shaft portions of the mechanism are shown at 1, 2, and 3. The shaft portion 1 drives in a discontinuous manner the shaft portion 2, through the intermediary of the disk 4 having two notches in the periphery thereof and coacting pinion 5 which operates in relation to the crown wheel 6. The pinion 5 and the disk 4 operate in the manner of a Maltese cross system. At every passage of a notch of the disk 4, pinion 5 turns by one pitch of its teeth, and causes the crown wheel 6 and the shaft 2 secured therewith to shift by a corresponding angle. Shaft 2 is thus driven by shaft 1, in a discontinuous manner, and in a predetermined ratio of reduction which is obtained by taking into account the pitch of teeth of pinion 5 and the ratio of teeth between pinion 5 and crown wheel 6. Every other discontinuous driving system is obviously applicable. The shaft portion 3 is driven in a similar way by the shaft portion 2 through a similar coacting gear.

The ratio of reduction between the portions is such that the controlled portion turns by the angular interval separating two successive positions of this portion for a rotation of the portion driving it, that corresponds to the totality of the positions of this portion.

In the example described, it is supposed that every portion can take ten positions, numbered from 0 to 9, each corresponding to the appearance of a numeral borne by a drum visible through an aperture of the counter.

In this case the ratio of reduction between the successive portions is ten to one.

The portion 1 of a shaft receives its movement from the system of worm and wheel gearing 7, 8. Worm 7 is itself set in motion, in the one or other direction through the system of friction rollers 9, 10, 11. The rollers 10 and 11, made integral with shaft 12, are capable of a translation movement along their axis under the action of the electromagnets 13 or 14. According to which of the two electromagnets is excited, one or the other roller, 10 or 11 drives roller 9; the passage from one roller to the other effects the change of direction of rotation. In the absence of excitation of both electro-magnets, the system of the paired rollers 10 and 11 is restored to a mean position by spring 15, with no engagement of roller 9. Any other driving system of shaft 1, with reversal of direction and de-clutching may, of course, be used.

The system of rollers 10, 11, 12 is driven by the motor 16. The current of this motor is automatically cut off outside the working periods, by the contact 17 of the relay 18, the excitation circuit of which passes through contacts 19 and 20 which are controlled by rollers 10 and 11, every roller, when operating, closing the corresponding contact, and opening it, on the contrary, in the stand-by or intermediate position.

On the shaft portions 1, 2, 3, (Fig. 2) there are respectively keyed special commutators, termed positioners, 21, 22, 23. For the sake of clarity in the connections, the same devices are represented in front views, separately, in Fig. 1. These positioners are arranged as follows: On a conductive central disk or drum 24, there are fixed two conductive arcuate members 25 and 26, these arcuate members being insulated from the central drum; the two arcuate members do not cover, however, the whole periphery, as two small sectors, 27, 28 electrically connected with the central disk or drum 24 extend between the two arcuate members. Around the drum there are disposed brushes 29 ($29_0$, $29_1$, $29_2$, etc.). These brushes are disposed on the same side of a diameter determined by output brushes 30, 31. They are in a number equal to the number of the positions of the shaft portions (ten in the chosen example, numbered from 0 to 9); they are angularly distributed in an equal manner on the half-circumference, the extreme brushes being respectively spaced from the two extremities of the half-circumference by an angle which is equal to half the angle separating the two positioning brushes. The output brushes are set at the two extremities of the half-circumference. The location of the notches on disk 4 and that of the toothed pinion 5 are such that the angular shifting of a shaft portion by that which drives it occurs at the time of the passage of the interval between the arcuate members at the extremity of the reference half-circumference (direction of rotation from brush 0 to brush 9) or at the time of the passage of the interval between the arcuate members at the origin of the reference half-circumference (direction of rotation from brush 9 to brush 0).

The brushes are capable of selectively contacting a mutual conductor.

For the convenience of illustrating the invention, this mutual conductor is shown in the form of a circular segment disposed under the respective brushes, but it must be understood that this mutual conductor is located at the place where the remote control is effected; wires connect the brushes 29 to this place and selective contacting means are provided at that place between the ends of these wires and the mutual conductor. These selective or distributive connection arrangements may also be widely different such as dials, switching devices, jacks and plugs, etc.

The mutual conductor 32 is electrically connected to the central part of the commutator 22 of the shaft portion 2 through the contact arm 33, the connection 34 and the brush 35. The commutators 22 and 23 are equipped in the same way and comprise the series of positioning brushes $36_0$, $36_1$, etc., $37_0$, $37_1$, etc., the output brushes 38, 39, 40, 41, the mutual conductors 42, 43, the connection 44 between the center of commutator 23 and the mutual conductor 42 of the positioning brushes of commutator 22.

The mutual conductor 43 of the last positioner is connected to the supply source of the relays, indicated by the positive sign +. The output brushes 30, 38, 40 are connected all together and with the electromagnet 13; the brushes 31, 39 and 41 are connected together and with the electromagnet 14.

The radial length of the positioning brushes, such as $29_0$, $29_1$, etc. is greater than that of the collecting brushes such as 30, 31, etc. in such manner that these brushes may bear on the small metallic sector, such as 27, 28 connected to the center of the commutator, this small sector not extending to the periphery, whereas the collecting brushes can be in contact only with the arcuate members, and not with the small sectors, this arrangement is provided in order to avoid simultaneous excitation of the two electromagnets 13, 14 and the beats resulting therefrom in the working of the device as explained hereinafter.

The operation is as follows: Let it be considered the connections $37_2$—43, $36_2$—42, $29_3$—32 are made on the control board represented at 50, and the positions of the commutators are as illustrated. The current of the source of the relays follows the circuit: +, 43, $37_2$, 41, 14. The system of rollers 10, 11, 12 moves to the left, establishing contact 19; the relay 18, being energized, closes its contact 17; the motor 16 starts running, driving the shaft portion 1 in counterclockwise rotation (looking at the shaft portion from the right side). At every passage of the tongue 28 beyond 31 (the extremity of the reference half-circumference), shaft portion 2 is moved in the same direction by one pitch (i. e. the angle of two positioning brushes). After the 6th pitch of this commutator, when the interval between the arcuate members initially situated opposite to brush 36, will pass beyond the extremity of the reference half-circumference (brush 39) the commutator 23 will turn by one pitch, the interval between the two half-circumferences, initially opposite to brush $37_1$ and will be placed at the position of brush $37_2$.

At that time, the circuit of the electromagnets will be constituted as follows: +, 43, $37_2$, 44, 42, $36_2$, 39, 14. The commutator 23 has reached the position chosen on the remote control board; the electromagnet 14 remains excited and the shaft portions 1 and 2 keep revolving in the same direction.

When the gap 45 between the arcuate members of commutator 22 comes under the brush $36_2$, the desired position of commutator 22, which is marked at the control board, is reached; the circuit of the electromagnets is constituted as follows: +, 43, $37_2$, 44, 42, $36_2$, 35, 34, 33, 32, $29_3$, 31, 14. The shaft portion 1 keeps turning in the same direction, until the gap 28 of commutator 21 comes under brush $29_3$. At that time, the energization of electromagnet 14 is cut off; the group of rollers 10, 11, 12 comes to a stand-by position, ceasing to drive the shaft portions and the motor 16 is de-energized.

Every shaft portion is then locked in the angular position which corresponds to the selecting brush chosen at the control station. The purpose of the invention, such as it is indicated at the beginning of this specification is therefore attained.

It should be observed that, the driving of the shaft portions is effected, sometimes in one direction, sometimes in the other direction, according to the place of the first positioning brush fed, with respect to the adjacent gap between the arcuate members at the time of the beginning of the operation, but in the course of one positioning operation, there is no reversal of the direction of rotation, whatever be the number of shaft portions. The arrangement permits a drive at a great speed without clashing the shaft portions against each other. It is to be further observed that if the marked position is over passed by the last shaft portion (owing, for instance, to the inertia of the moving parts), a correcting rotation in the reverse direction is immediately initiated.

Through the control of an endless worm of the type described in the French patent filed on the 24th of September 1941, under the heading "Démultiplicateur à deux vitesses" and in the additions to the same patent which correspond to United States application Serial Number 591,714, filed May 3, 1945, for Device for conversion of frequencies, an operation is obtained without hunting in spite of a very high driving speed.

Supposing that, in the preceding combination, the connection 37₂—43 is replaced by the connection 37₀—43, that is, if the control commutator of the transmitter 43 is placed on the stud 0 instead of being placed on the stud 2, the current of the source follows the path: +, 43, 37₀, 40, 13. The unit 10, 11, 12 is displaced toward the right establishing the contact at 20, and applying at the same time 11 on 9; the relay 18 is set under voltage as before and closes its contact 17; the motor starts and again drives the organ 7 and consequently also the shaft branch 1, but this time in the clockwise direction, always viewing the branch from the right side. The remaining operations are effected as before.

My invention is capable of diverse applications as indicated in the statement of objects of the invention.

For instance, each shaft portion may carry a wheel with numerals of a cyclometric counter with the digits from 0 to 9. The position of each commutator and of the shaft portions being confined to 180° more or less, each drum will bear two series of digits from 0 to 9, i. e., one on each half circumference. There will be as many wheels as the number to be formed has digits, every wheel corresponding to the decimal order which is immediately above that of the digits of the wheel that is to be found on the right thereof for instance the wheels of the hundreds, of the tens and of the units.

Or again, each shaft portion may be one of the shafts of the combination contrivance of the shaft of a device with successive changes of frequency of the type of those which are the object of United States patent application Serial Number 591,714, filed on the 3rd of May, 1945, entitled Device for conversion of frequencies.

The invention is, of course, capable of numerous modifications of embodiment, especially as regards the constitution of the members which are in the combination of the arrangement. Thus, for instance, the positioning system with brushes, which is assumed to be embodied in the form of a disk, may be transposed into a cylindrical form, with the collecting brushes shifted along the axis with respect to the positioning brushes, and the tongues disposed between the plates being extended along the mechanism.

While I have described my invention in one of its preferred embodiments I desire that it be understood that no limitations upon my invention are intended other than may be imposed by the scope of the appended claims.

What I claim is:

1. An electromechanical remote control device for the angular position of several rotary shafts in mechanical connection geared down in succession, comprising in combination: a multiplicity of rotary shafts, a voltage source, control commutators equal in number to that of the said rotary shafts, each having a movable conductor which shifts on contacts marked with suitable signs and which can establish selective connection with only a single contact at a time, each of the said control commutators being associated contact by contact with a receiving commutator which is integral with one of the said rotary shafts and which includes reversing means connected to two electromagnetic organs which act on a mechanical driving device reversing the direction of rotation, the said driving device being mechanically connected with the said rotary shafts.

2. An electromechanical remote control device as set forth in claim 1 wherein the mechanical connection between the said rotary shafts is discontinuous and is brought about between each driving shaft and its driven shaft by means of an intermediate organ whose connection with the driving shaft is intermittent in the course of each revolution of the said driving shaft.

3. An electromechanical remote control device as set forth in claim 1, wherein the said reversing means consist of two rotary conducting arcuate members, insulated from each other, and connected respectively to each of the said electromagnetic organs.

EMILE TORCHEUX.

REFERENCES CITED

The following references are of record in the file of this patent:

UNITED STATES PATENTS

| Number | Name | Date |
|---|---|---|
| 1,166,034 | Akemann | Dec. 28, 1915 |
| 1,281,163 | Hopkins et al. | Oct. 8, 1918 |
| 1,375,437 | Akemann | Apr. 19, 1921 |
| 1,424,027 | Murphy | July 25, 1922 |
| 1,465,285 | Peterson | Aug. 21, 1923 |
| 1,468,660 | Davis | Sept. 25, 1923 |
| 1,960,103 | Fierce | May 22, 1934 |
| 2,083,947 | Furber | June 15, 1937 |
| 2,087,039 | McMaster | July 13, 1937 |
| 2,241,548 | Frischknecht | May 13, 1941 |